United States Patent Office 3,346,519
Patented Oct. 10, 1967

3,346,519
PROCESS OF ADHERING ANIONIC AND NON-IONIC SUBSTANCES TO ANIONIC SUBSTANCES
John C. Williams, Meriden, Conn., assignor to Hawley Products Company, St. Charles, Ill., a corporation of Delaware
No Drawing. Filed Nov. 12, 1964, Ser. No. 410,779
12 Claims. (Cl. 260—9)

This application is a continuation-in-part of my copending application Ser. No. 129,516, filed Aug. 7, 1961, now abandoned.

This invention relates to a new class of resins and more particularly to a new class of reactive cationic water soluble resins possessing great utility in the processing of normally anionic fibers, such as, for example, cellulose, in the manufacture of paper, moldings containing such fibers, wall board, and other fibrous articles.

One of the objects of the invention is to provide a new and improved resinous material which is substantive to water dispersed anionic fibers, especially cellulose fibers, and which can be added in the beater to make the processed fibrous article water repellant.

Another object of the invention is to provide a resinous material which can be used in the manner described without the use of alum, thereby avoiding the well known deleterious effects of alum which occur on the aging of a cellulose product.

Another object is to provide a water dispersed thermosetting resin which may be applied to paper and paper products as a tub size. This size not only acts as a binding and strengthening agent but also improves subsequent wetting and bonding of solvent based adhesives.

Still another object is to provide a beater treatment of cellulose fibers, alone or in admixture with other fibers, with a resinous material which will give the resultant dried and cured felted product good wet strength.

Still another object of the invention is to provide a cationic resinous colloid which will both neutralize the negative charge on water dispersed anionic fibers, such as cellulose, and attach lipophilic groups to assist in the deposition of hydrocarbon solvent soluble resins and/or their solvent solutions on the fiber.

A further object is to provide a cationic resinous colloid which will deposit on and chemically react with anionic fibers, such as cellulose, in the water dispersed state. In this objective is included the preparation of fiber slurries in which one or more treated fiber varieties will accept oil or organic solvent soluble resins and other untreated fibers will reject them.

An additional object of the invention is to improve the colorability and dyeability of anionic fibers, such as, for example, cellulose, with oil soluble dyes or colored solvent soluble resins.

Another object of the invention is to provide water soluble cationic resins substantive to and reactive with water swollen cellulose fibers which carry and affix lipophilic molecular regions so that the fibers when used as moist or dry filters will wet with and retain large quantities of tars or oily materials. Such fibers are useful in making cigarette filters.

Another important object of the invention is to alter the wettability of cellulose and other anionic fibers in aqueous slurries so that such fibers will be wet by catalyzed unsaturated organic (ethenoid) monomeric molecules and readily undergo graft polymerization.

A further object is to provide a process of chemically attaching unsaturated groups to anionic fibers, such as cellulose, so that they can copolymerize with unsaturated organic (ethenoid) monomeric molecules. Other objects will appear hereinafter.

For the purpose of description, the invention may be divided into several parts as follows:

(1) Epoxidized precondensates.
(2) Epoxidized precondensates reacted with formaldehyde or paraformaldehyde.
(3) Epoxidized precondensates containing unsaturated reactive groups.
(4) Epoxidized precondensates containing long chain fatty amines.
(5) Anionic fibers, such as cellulose, treated or reacted with compositions of the type referred to in (1), (2), (3) and (4).
(6) The products obtained by adding various types of resins and combinations of resins to the products of (5).
(7) The products obtained by reacting the compositions of (1), (2), (3) and (4) with starch and starch degradation products, for example, gelatinized starch, dextrins, gums, and other products derived from starch by heat, oxidation, (including chlorination), acidification and enzymatic action.

In the following description, the foregoing divisions of the invention will be discussed in order.

EPOXIDIZED PRECONDENSATES

It is known in the art that precondensates which have been described as water soluble epoxy amine resins can be prepared by reacting an aliphatic polyamine with a resinous epoxide. These precondensates are water soluble and form water soluble salts with acids. Such precondensates can be used as starting materials for the purpose of the invention by further reacting them with a suitable polyepoxide. The resultant epoxidized precondensate has novel and useful properties as hereinafter described.

In the preferred practice of the invention a polyepoxide is reacted with a polyamine containing at least two nitrogen atoms and at least four carbon atoms in the polyamine and the reaction is carried out with proportions of the reactants such that there are a sufficient number of reactive amino groups to react with at least two epoxide groups in the polyepoxide. For example, one suitable polyepoxide is a diepoxide having the following formula (1) 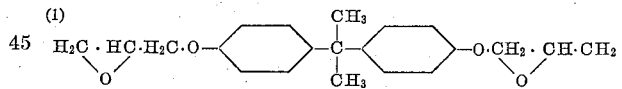

This is a diepoxide made by reacting epichlorhydrin with 4,4'-dihydroxydiphenyldimethylmethane. In order to make a precondensate for the purpose of this invention, one mole of this diepoxide is reacted with two moles of a polyamine having two primary amino groups as, for example, diethylenetriamine. This produces a water soluble precondensate which is also soluble in dilute acids. The resultant precondensate is then mixed with an additional quantity of the diepoxide of Formula 1 and heated until incipient gelation occurs. At this point the reaction is short stopped by lowering the pH. An acid, preferably hydrochloric acid, is usually added to the epoxidized precondensate solution to adjust the pH and stop the reaction. The resultant product is an epoxidized precondensate of a polyepoxide and a polyamine.

This resin and others of its class are unusual in their ability to react with anionic fibers, such as, for example, cellulose, and to alter the characteristics of such fibers. These resins are also capable of reacting with starches and starch degradation products to alter the characteristics of such substances and to introduce cationicity into the molecule.

One of the important characteristics of these epoxidized precondensates is their ability to combine with cellulose in order to impart an oil wetting property and make it possible for oil wetting resins, including hydrocarbon resins, e.g., polystyrene, styrene-butadiene copolymers (high impact polystyrene), petroleum resins (Panarez), and other resins, e.g., polyester resins, polyacrylonitrile, and oleoresinous varnish, to establish a firm bond with the cellulose in the wet. Thus, any resin which is dissolved in a hydrocarbon solvent (e.g., naphtha) will adhere to the cellulose after it has been altered by treatment with an epoxidized precondensate as herein described. Emulsions of synthetic and natural rubbers can similarly be applied to the altered cellulose in the wet. One of the problems heretofore, for example, in adding oil soluble or oil wetting resins to cellulose in aqueous slurries in a beater operation employed in the paper industry and in the manufacture of molded fiber products, has been the lack of affinity of such resins for the wet cellulose fiber. They normally tend to form globules and collect on the sides of the equipment rather than on the fiber, or if they become associated with the fiber, they are very readily removed from it. The present invention provides a simple means of enhancing the affinity of such resins for cellulose and other anionic fibers.

The initial union of the polyepoxide with the polyamine is exothermic and very rapid. The reaction goes easily and a minimum of control is needed. The products are thermoplastic and water soluble. In the second stage, that is, the epoxidation of the precondensate, the reaction proceeds more slowly and it is normally desirable to control the second reaction to produce water soluble resins and to stop the reaction by chilling and dilution prior to gelation or at the point where the viscosity has increased to incipient gelation. At the point of incipient gelation the resin will form a string on a glass stirring rod. If precautions are taken to stop the reaction quickly, the epoxidized precondensates can be formed in one step rather than two steps. It is difficult, however, to prevent gelling in a one step process due to the exothermic nature of the process.

Many different types of polyepoxides may be employed as starting materials. One way of defining the polyepoxides is by the expression "epoxide equivalent." The epoxide equivalent is the number of grams of resin containing one gram equivalent of epoxide. For the purpose of this invention the polyepoxide used in making the initial precondensate should have an epoxide equivalent within the range of 43 to 1000. Thus, one commercial material having the general structure of Formula 1 which can be used for the purpose of the invention is a mixture of epoxidized dihydroxydiphenyldimethylmethane having an average epoxide equivalent of 175 to 210 (Epon 828).

Other examples of suitable polyepoxides for the manufacture of the precondensate are the following:

(a) Glycidyl ether resins, e.g., a compound having the following formula

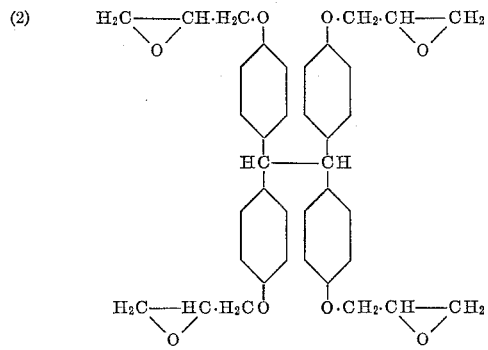

(b) Butadiene diepoxide having the formula

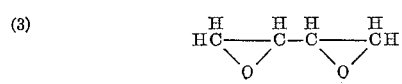

(c) Epoxy novolac resins, e.g., those having the following formula

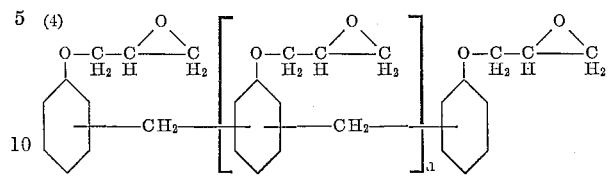

where $n$ is a positive value representing a number of recurring monomeric units.

In general, the epoxides used in the invention are prepared by condensing polyhydric compounds, especially dihydric phenols, with polyfunctional halohydrins, especially epichlorhydrin and glycerol dichlorohydrin. The epoxide used in the first state of the process must be a polyepoxide, that is, it must contain two or more 1,2-epoxide groups per molecule. In the second stage of the process, however, additional epoxide groups are added either by adding the same polyepoxide or a different polyepoxide from that used in the first stage or by adding a substance capable of introducing 1,2-epoxide groups into the molecule, such as, for example, epichlorhydrin or other glycerol halohydrin.

The amine reactant must contain at least two amino nitrogen atoms having reactive hydrogen atoms and should contain more than two carbon atoms because ethylene diamine has not been found to be satisfactory for the purpose of the invention. The best results have been obtained with amines containing at least two primary amino groups and one or more secondary amino groups. Typical examples of amines suitable for the invention are propylene diamine, N-methyl propylene diamine, N-propyl propylene diamine, butylene diamine, hexamethylene diamine, polyethylene polyamines, such as, for example, diethylene triamine, triethylene tetramine, tetraethylene pentamine, and polypropylene polyamines, such as, for example, dipropylene triamine.

The first and second stages of the reaction are carried out under ordinary alkaline conditions, the alkalinity being supplied by the amine.

In the first stage of the reaction the heat is normally supplied by the exothermic nature of the reaction but gentle heating to a temperature of say 120° F. is sometimes desirable to initiate the reaction. In general, the temperature during the first stage of the reaction is within the range of 120° F. to 350° F. In the second stage the reaction can be carried out at room temperature, that is, 70° F. but it is usually preferable to employ a compatible inert solvent, such as, for example, isopropyl alcohol, and where a solvent is used it is desirable to carry the reaction out at a temperature below the boiling point of the solvent. Of course, the solvent can be vaporized during the process and it can also be refluxed and returned to the reaction mixture. For example, where isopropyl alcohol is used as the solvent, a reaction temperature of about 140° F. is normally employed. Another preferred solvent is methyl ethyl ketone. Higher boiling solvents, such as xylene, have also been used and with such solvents the process can be carried out at a higher temperature without evaporating the solvent. In general, however, it is preferred to use a water miscible solvent or one which is at least partly water miscible, otherwise the presence of the solvent introduces a cloudy appearance when the product is mixed with water.

The time required to carry out the reaction is subject to variation. In the first stage the reaction is usually continued until the elevated temperature, due to the exothermic nature of the reaction, subsides. In the second stage the higher the temperature the shorter the time of reaction. In other words, a longer period is required to carry out the reaction at 70° F. than at 140° F. and the time is determined by the time required to produce incipient gelation.

The reaction is stopped in the second stage by any one of a number of expedients, such as chilling, dilution and treatment with an acid. Treatment with an acid is the preferred method. Various acids may be used but it is preferable to use hydrochloric acid. The epoxidized precondensates can be characterized as being soluble in 2.5% by weight hydrochloric acid at 20° C. In connection with stopping the reaction it should be noted that dilution with water will slow down the reaction but a reduction in pH by the addition of an acid is desirable to stop the reaction completely, otherwise a slow reaction will continue and a precipitate will form in the aqueous slurry. The reduction in pH can be stopped while the product is still on the alkaline side, for example, at pH 8, or it can be continued until the product is on the acid side. The pH of the product does not appear to be a factor in its subsequent reactions with cellulose and products having a pH from 2 to 12, where the pH has been adjusted with either caustic soda or hydrochloric acid, have reacted satisfactorily with cellulose.

The invention will be further illustrated by the following examples in which the quantities are stated in parts by weight unless otherwise indicated.

*Example I*

4.1 grams (0.04 mole diethylene triamine was mixed with 7.8 grams (0.02 mole) of Epon 828 (a diepoxide produced by Shell Chemical Company) and heated to 120° F. The exotherm took the temperature to 250° F. When the material had cooled to 160° F. it was dissolved in 20 grams of methyl ethyl ketone and 4 grams of Epon 828 added. The solution was held at 160° F. for ½ hour until the viscosity increase indicated incipient gelation. The solution was then stirred into 50 grams of water plus 8 grams of 28% hydrochloric acid. The pH of this resin solution was 6. This resin and others of its class are unusual in their ability to make dispersed cellulose fiber take up large amounts of water insoluble resins.

*Example II*

The two stage reaction of Example I was carried out. The second stage was (a) with no solvent; (b) with water; (c) with isopropyl alcohol, and (d) with methyl ethyl ketone.

(a) 20 grams of tetraethylene pentamine (0.105 mole) was heated to 130° F. with 20 grams of Epon 828 (0.056 mole) and allowed to go through the exotherm. This is Adduct A. After cooling to 160° F., 10 grams of Epon 828 was added and the reaction allowed to heat back to 158° F. to incipient gelation. At this time it was short stopped by diluting with 50 grams of methyl ethyl ketone plus 200 grams of water and 20 grams of 28% by weight hydrochloric acid.

(b) 40 grams of Adduct A was dissolved in 100 grams of water and 10 grams of Epon 828 added. The temperature was held at 140° F. with good stirring for 10 minutes during which time the solution thickened to a heavy paste. 100 grams of water was now added, with 20 grams of 28% hydrochloric acid. The solution was stirred until reasonably clear. A sludge later formed in this material without affecting its activity. It was observed that (a) tended to be a lower molecular weight resin than (b) because of the necessity for quick dilution before cross linking and insolubility had set in.

(c) 40 grams of Adduct A dissolved in 50 grams isopropyl alcohol or 25 grams methyl ethyl ketone (d) and treated with 10 grams Epon 828 was heated ½ hour at 160° F. until viscosity and slight gel formation indicated incipient gelation. This was then diluted with 200 grams of water, and 20 grams of 28% by weight hydrochloric acid. The solvent systems of (c) and (d) give clear solutions slightly less active than the water of (b). For safety in preparing large batches in open equipment the use of water is advantageous.

*Example III*

(a) 13 grams hexamethylene diamine was heated to 120° F. with 20 grams of Epon 828 under a hood. There was a rapid evolution of heat. The liquid product was allowed to cool to 140° F. and 5 grams of Epon 828 plus 25 grams of methyl ethyl ketone was added. After 5 minutes at 160° F. the resin was dissolved in 100 grams of water and 15 grams of 28% hydrochloric acid. The resin had a very good color.

(b) 5 grams of tetraethylene pentamine, 2 grams of phenylene diamine and 7 grams of Union Carbide Plastics Company diepoxide ERL-2774 were heated to 120° F. and allowed to go through the exotherm. This was dissolved in 200 grams water and 12 grams of 28% hydrochloric acid.

(c) 14.6 grams of triethylene tetramine was heated with 20 grams Epon 828 and allowed to go through the exotherm. After cooling to 160° F. it was dissolved in 50 grams methyl ethyl ketone and 10 grams Epon 828 added. This was held at 150° F. for approximately 25 minutes until the solution became of high viscosity. 200 grams water and 20 grams 28% by weight hydrochloric acid were now added.

*Example IV*

(a) 20 grams tetraethylene pentamine was heated with 4.3 grams of butadiene diepoxide and allowed to stand until heat was no longer evolved. 3.0 grams of butadiene diepoxide was then added and the solution heated to 160° F. until temperature and viscosity were rising sharply. 200 grams water and 20 grams 28% by weight hydrochloric acid were then stirred in.

(b) Shell Chemical Epon 812 is an aliphatic diepoxide with an epoxide equivalent given as 140–160. 20 grams of tetraethylene pentamine were heated with 10 grams of Epon 812 by the exothermic reaction and remained fluid. This product was dissolved in 50 grams isopropyl alcohol and 7 grams Epon 812 added. In 10 minutes at 140° F. viscosity had risen to a point indicating imminent gelation and 200 grams of water plus 10 grams of 28% by weight hydrochloric acid was added. This 12.5% solution was at pH 8.5 and was water thin.

(c) Resorcinol diglycidyl ether (RDGE) has a molecular weight of 222.2. 18.0 grams (0.1 mole) of tetraethylene pentamine was heated with 11 grams (0.05 mole of the RDGE). After exotherm and cooling to 140° F. this was dissolved in 50 grams isopropyl alcohol and 5 grams RDGE added. This was held at 140° F. until bodied and diluted with 200 grams of water plus 10 grams of 28% by weight hydrochloric acid.

(d) 18.0 grams of tetraethylene pentamine (0.1 mole) was heated with 10 grams of Dow DEN 438 (0.017 mole), an epoxy Novolac resin having an average functionality of 3.3 and an epoxide equivalent of 179 (Formula 4). This made a heavy solution at 200° F. At 160° F., 50 grams isopropyl alcohol was stirred in and the solution held at this temperature until the viscosity had risen. The solution was then dissolved in 200 grams of water plus 10 grams 28% by weight hydrochloric acid.

*Example V*

150 grams tetraethylene pentamine (TEP) and 150 grams diepoxide (Epon 828) were mixed, heated and allowed to go through the exotherm. When the temperature reached 160° F. on cooling, isopropyl alcohol was added to give a 67% adduct stock solution. 30 gram portions of solution (20 grams adduct) were mixed with 50 grams isopropyl alcohol and the same diepoxide (Epon 828) as follows:

|     | Diepoxide (Grams) | Percent Nitrogen in Resin |
|-----|-------------------|---------------------------|
| (a) | 7                 | 13.6                      |
| (b) | 10                | 12.3                      |
| (c) | 20                | 9.2                       |
| (d) | 30                | 7.4                       |
| (e) | 40                | 6.1                       |
| (f) | 50                | 5.3                       |

These were heated to 120° F. and allowed to stand until viscosity build-up started and then mixed with 200 grams of water and 10 grams of 28% by weight hydrochloric acid. (a), (b), and (c) gave clear solutions. (d), (e), and (f) were opaque and kept bodying until gelled. (d), (e), and (f) were remade using 400 grams of water instead of 200 grams of water for dilution. The resultant solutions were still opaque, but stable during the experiment.

*Example VI*

(a) 20 grams tetraethylene pentamine was reacted with 20 grams of Epon 828 as in Example I. This was cooled to 140° F. and dissolved in 40 grams of methyl ethyl ketone. 100 grams of water was added and also 10 grams of 28% by weight hydrochloric acid. The pH was 9. 10 grams of epichlorhydrin solution (50% in methyl ethyl ketone), was slowly added to the adduct solution and the temperature brought to 160° F. slowly and with good stirring. 10 grams more of the epichlorhydrin solution was slowly added (exotherm). The solution was held at 160° F. until clear. At 20% concentration the solution gelled over night. It could be kept for a week by diluting to 5% concentration with water.

*Example VII*

(a) 20 grams tetraethylene pentamine plus 30 grams Epon 828 were dissolved in 50 grams of isopropyl alcohol and heated to 140° F. This solution then boiled gently from the heat of the reaction. After 5 minutes the viscosity began to build up, and at the point that a 10 inch thread would spin off the thermometer, and the viscosity was approximately 600 centipoises, the reaction was stopped by pouring in 200 grams of water plus 20 grams 28% by weight hydrochloric acid. Viscosity was now 12 centipoises at 110° F. and the solution at 14.4% solids.

Adding more isopropyl alcohol will allow a higher molecular weight build up before the water-acid quench. This higher molecular weight promotes room temperature adsorption and activity.

(b) 20 grams of tetraethylene pentamine and 30 grams of Epon 828 were dissolved in 100 grams of isopropyl alcohol, heated to 140° F. and then allowed to stand. The exotherm was not vigorous enough to heat this and the mixture gradually cooled to 100° F. After two hours the solution had thickened to about 1000 centipoises and had become slightly cloudy. This was dissolved in 200 grams of water and 20 grams of 28% by weight hydrochloric acid. The pH was 8.5 and the viscosity 19 centipoises at 80° F.

The foregoing Example VII(a) and VII(b) illustrates a one step process of making the resins of the invention.

*Example VIII*

20 grams of tetraethylene pentamine (0.10 mole) was mixed with 20 grams (0.053 mole) of Epon 828 and heated to 130° F. The exotherm carried the temperature to 250° F. After cooling to 160° F. 10 grams of Epon 828 was added and heating continued to incipient gelation. The resin was then dissolved in 100 grams of water and 20 grams of 28% by weight hydrochloric acid. The pH was 9.0.

All of the resins in Examples I to VIII are useful in altering cellulose. This utility is undoubtedly due to a large cation coupled with active epoxy groups which are capable of binding the cation to the cellulose. If the altering resin and water dispersed cellulose are heated to 140° F.–200 F., there is a reaction with the cellulose through the oxirane ring. The altering resin cannot then be removed from the cellulose and the highly developed lipophilic group which preferably has a molecular weight of at least 150 (e.g., contributed by the bisphenol of the polyepoxide) is attached. This heat reacted fiber will accept polystyrene from xylol-naphtha solution of polystyrene while fibers treated with a resin containing a less highly developed lipophilic group will not.

In the foregoing examples it will be observed that the initial reaction between the polyepoxide and the polyamine is carried out under essentially anhydrous conditions. In the second stage, or later stages of the reaction with additional polyepoxide, water can be added to assist in stopping the reaction. However, the addition of an acid is desirable in order to stop the reaction completely. The mechanism of the reaction at this point is not clearly understood. It is possible that the acid reacts with the amino groups to form amine salts. The use of hydrochloric acid is especially desirable because it does not substantially affect the properties of the resultant product. However, other dilute acids which ionize to give monovalent anions can be used, such as, for example, acetic acid, propionic acid, and the like. Sulfuric acid precipitates the resin. Phosphoric acid probably ionizes $H^+ + {}^-H_2PO_4$ and hence precipitates the resin only to a slight extent.

An essential requirement of the product is that it be thermoplastic and soluble in a dilute 2.5% by weight hydrochloric acid solution. In order to meet this requirement it is necessary to maintain a balance between the polyamine and the polyepoxide which may vary depending upon the particular reactants. In general, it is desirable to use an amount of a polyamine such that there are at least two equivalents of reactive amino groups for each epoxide equivalent in the first stage of the reaction and then to add in the second stage of the reaction 0.1 to 0.8 equivalent of additional epoxide group. A larger quantity of epoxide can be added in the second stage of the reaction, provided adequate dilution is maintained. However, a point is eventually reached where the addition of a further quantity of the epoxide no longer enhances the affinity of the resin for cellulose fiber but, on the contrary, actually reduces such affinity. The altering resin preferably contains 16 to 70 epoxy groups per 100 moles of resin. The nitrogen content is preferably at least 9% by weight.

The following section illustrates the results obtained by adding formaldehyde to the epoxidized precondensates previously described. The formaldehyde is ordinarily added as formalin but paraformaldehyde or other formaldehyde-liberating compounds can be used. The addition of the formaldehyde produces resinous solutions which are more reactive than the epoxidized precondensates and which will react with cellulose at lower temperatures than the epoxidized precondensates. The formaldehyde also has a second function in that it introduces methylol groups into the resin. These groups are hydrophilic and they act to prevent adsorbed lipophilic molecules from being dissolved off the fiber by solvent or liquid resin.

EPOXIDIZED PRECONDENSATES REACTED WITH FORMALDEHYDE

In the following examples in which the quantities are stated in parts by weight unless otherwise indicated, illustrations are given for the preparation of epoxidized precondensates reacted with formaldehyde.

*Example IX*

The procedure was the same as that described in Example VIII except that 20 grams of formalin was added to the resin solution obtained in Example VIII. The addition of the formaldehyde contained in the formalin solution causes polymerization of the resultant resin to take place at lower temperatures than the resin of Example VIII.

Example X

The procedure was the same as that of Example II(a) except that 20 grams of formalin was added. Again the activity of the resin was enhanced in the treatment of cellulose fiber.

Example XI

The procedure was the same as that of Example II(c) except that 20 grams of formalin was added along with the 200 grams of water and the 20 grams of 28% by weight hydrochloric acid. A resin of enhanced activity was obtained.

Example XII

The procedure was the same as in Example III(b) except that 14 grams of formalin was added to the resin solution of Example III(b).

Example XIII

The procedure was the same as in Example III(c) except that 10 grams of formalin was added to the final resin solution of Example III(c).

Example XIV

The procedure was the same as that described in Example IV(a) except that 10 grams of formalin was added to the final resin solution of Example IV(a).

Example XV

The procedure was the same as that described in Example IV(b) except that 10 grams of formalin was added to the final resin solution of Example IV(b). This caused the solution to form into a soft gel which redispersed with 200 grams more water.

In the foregoing examples the amount of formaldehyde or formaldehyde-liberating substance employed is subject to variation but it is preferable to use at least one mole of HCHO per mole of epoxidized precondensate so as to introduce at least one methylol group into each molecule of the resin.

EPOXIDIZED PRECONDENSATES CONTAINING UNSATURATED REACTING GROUPS

In practicing the invention it is possible to incorporate unsaturated reactive groups into the epoxidized precondensates so that when the resultant resin solution is applied to cellulose or other material unsaturated groups are available which are capable of copolymerizing with ethenoid monomers, such as, for example, acrylonitrile, styrene, vinyl toluene, acrylic acid, methyl methacrylate, ethyl methacrylate, and other monomers containing an ethanoic linkage capable of polymerizing with the unsaturated group of the epoxide precondensate resin. One source of such unsaturated groups is allyl glycidyl ether but it will be understood that other substances containing both an unsaturated group and an epoxide group can be employed for the purpose of the invention.

This phase of the invention is illustrated by the following examples in which the quantities are stated in parts by weight.

Example XVI 11.4 grams (0.1 mole) of allyl glycidyl ether were reacted with 18.9 grams of tetraethylene pentamine (0.1 mole) by heating to 160° F. The reaction evolved heat for 10 minutes and then was held at 190° F. for another 10 minutes to insure complete reaction. This adduct was allowed to cool to 140° F. and 20 grams of Epon 828 stirred in. The temperature began to rise rapidly and at 180° F., 30 grams of isopropyl alcohol was stirred in. 5 grams more of Epon 828 was added and the temperature held at 160° F. for 20 minutes until the viscosity had risen to 300 centipoises at 80° F. The resin solution was dissolved in 500 grams of water containing 20 grams of 28% hydrochloric acid. The resins of this example and of XVII were found to be excellent sizing agents for glass fiber to be used in polyester moldings.

Example XVII

The procedure was the same as that described in Example XVI except that 10 grams of formalin was added to the final resin solution.

EPOXIDIZED PRECONDENSATES CONTAINING LONG CHAIN FATTY AMINES

It has been found in the practice of the invention that the addition of a cation containing a hydrophobic group substantially increases the water repellancy of epoxidized precondensates, for example, when the latter are applied to cellulose fibers. A relatively large number of fatty amines are known and can be used in the practice of this phase of the invention, such as, for example, dodecylamine, tetradecylamine, hexadecylamine, oleylamine and the long chain polyamines in which a primary amino group is connected through an alkylene radical to a secondary amino group in which one of the hydrogen atoms is substituted with an alkyl group containing 12 to 18 carbon atoms or mixtures of such alkyl groups. Such amines are prepared, for instance, by reacting fatty amines with acrylonitrile and then hydrogenating to make N-alkyl trimethylene diamines. The original fatty amines are derived for coconut oil, soya bean oil, oleic acid and tallow. One commercial amine which is supplied under the name "Duomeen O" is approximately 80% diamine, has a melting point of approximately 20–26° C., a combined weight of 356 to 387, a theoretical molecular weight of 321, and an equivalent weight of 201.

The following examples in which the quantities are stated in parts by weight illustrate the practice of the invention where such long chain amines are incorporated into the resin.

Example XVIII 20 grams of Duomeen O (0.05 mole) and 10 grams of tetraethylene pentamine (0.053 mole) were mixed with 20 grams Epon 828 (0.053 mole) and heated to 180° F. The exotherm quickly took this to 250° F. When the temperature had dropped to 150° F., 50 grams of isopropyl alcohol and 10 grams of Epon 828 were added. The temperature was held at 160° F. for 10 minutes until bodying was pronounced and the resin was then dissolved in 200 grams of water plus 20 grams of 28% by weight hydrochloric acid. The soluble was clear and smooth. The pH was 9, the viscosity was 310 centipoises at 80° F. and 18.2% was total solids. When the solution was diluted to 10%, viscosity dropped to 10 centipoises.

Example XIX

The procedure was the same as in Example XVIII except that 10 grams of formalin was added to the final resin solution and the viscosity rose to 16 centipoises.

Example XX 15 grams of tetraethylene pentamine, 5 grams of dodecyl amine and 20 grams of Shell Epon 828 were heated to 120° F. and allowed to go through the exotherm (200° F.). The product of the reaction was dissolved in 50 grams of isopropyl alcohol, 10 grams of Epon 828 were added, and held at 140° F. for 30 minutes. The solution bodied and just before gelation was poured into 300 grams of water plus 20 grams of 28% by weight hydrochloric acid.

Example XXI

The procedure was the same as in Example XX except that 10 grams of formalin was added to the final resin solution.

ANIONIC FIBERS, SUCH AS CELLULOSE, TREATED WITH PREVIOUSLY DESCRIBED RESINOUS COMPOSITIONS

One of the unusual properties of the resins of the invention is their ability to alter cellulose fibers. The resins of the invention contain a large cation and hence are capable of imparting cationic properties to cellulose fibers and starchy materials. They also contain a reactive epoxide group which is capable of reacting with cellulose fibers and starchy materials so that a coating of the resin solution will adhere to such substances. Furthermore, the resins of the invention have an affinity for oil soluble substances which do not ordinarily adhere to cellulose or starchy materials. Additionally, the resins of the invention improve the wet and dry strength of products made from cellulose and other anionic substances.

The following examples illustrate the application of the resin to various types of cellulosic materials.

Example XXII (a) 20 grams of white kraft cellulose was opened in 1½ gallons of water at 120° F. and 2% of the resin of Example I (dry basis) was applied. The fiber was then felted in a sheet machine and made back up in 4 gallons of 85° F. water and refelted. This was done five times, which amounted to a very thorough washing.

(b) the procedure described under (a) was repeated using 0.5% of the resin instead of 2%. This produced a cellulose fiber containing a lower wet strength and dry strength but the resin remained bonded to the fiber even after the multiple washings because the fiber was still oil wetting and paper made from it was wet strong.

Example XXIII (a) 10 grams of ½" sisal fiber was slurried in 1500 grams of water at 120° F. and treated with 4% of the resin of Example I. The slurry was then felted into a sheet, redispersed in 8 gallons of water and refelted. The refelted sheet was then redispersed in 1500 grams of water at 120° F. and 10 grams of 1" sisal fiber was added. The slurry was refelted to produce a felted fiber consisting of a mixture of modified and unmodified sisal fibers. The portion of the sisal fiber which had been modified by the resin was oil wetting and the other portion which had not been modified was not oil wetting.

(b) 5 grams (dry basis) of the resin of Example I was dissolved in 1000 grams of water and heated at 140° F. for 30 minutes. 20 grams of sisal fiber was then added and found to become oil wetting.

(c) 10 grams of sisal fiber was added to 1000 grams of water containing 5 grams of the resin of Example I and the slurry was heated for ½ hour at 200° F. The sisal became oil wetting. 10 grams of sisal fiber added to the slurry after the heating did not become oil wetting. Thus in this experiment the resin had deposited and increased in molecular size on the fiber surface, leaving none in solution.

As shown by the foregoing example, it is possible to have a mixture of fibers wherein one fiber will accept a colored lipophilic resin from an aqueous slurry and another fiber in the slurry will reject the resin. In this way, it is also possible to color one fiber and leave another fiber uncolored, thereby producing novel decorative effects.

Example XXIV

The resin solution obtained as described in Example VII(b) was mixed with 20 grams of formalin and the solids were adjusted to 12% by weight. In 24 hours the viscosity had risen to 1950 centipoises at 80° F. but the solution was easily dilutable with water.

100 gram portions of bleached kraft were opened in 1½ gallons of water at 120° F. and after the additions of resin solution had been made were diluted with 6 gallons of cold water and felted in a sheet machine (12 x 12 inches). There was a marked tendency to foam which was controlled by adding ⅓ cc. of a mixture of decanol and tributyl phosphate. The felted pads or sheets were then die dried at 50 pounds per square inch (p.s.i.) and 400° F. for 3 minutes. They had an average thickness of 50 thousandths of an inch.

One inch wide strips were cut from the pads and tested to determine the number of pounds required to break them. The values given below are for an average of four tests. The "wet" strips were soaked for one hour before test.

|  | Pounds to Break One Inch Strips | |
| --- | --- | --- |
|  | Dry | Soak One Hour |
| Bleached Kraft | 44.4 | 3 |
| Plus 1% resin | 98.2 | 25.8 |
| Plus 2% resin | 134.0 | 29.4 |
| Plus 4% resin | 122.0 | 42.9 |

A test was also made under the same conditions adding 2% by weight of a standard wet strength melamine-formaldehyde resin (Parez 607) to the bleached kraft pulp and this gave a pad which required 74.9 pounds to break it in the dry and 22.3 pounds to break it after soaking for one hour. This example shows that the resin of the present invention is one of the most effective wet strength resins available since a 4% by weight treatment gives a wet strength equalling the dry strength of the bleached kraft pulp. It is particularly noteworthy that 2% by weight of this resin more than tripled the dry tensile strength of the kraft pulp.

Example XXV

The kraft, resin and procedure of Example XXIV were used, with 2% by weight of the altering resin added to the stock, followed by 10% Epon 828. The stock was not sticky. When die dried it showed 86.2 pounds dry tensile per inch and 35 pounds after an hour soak. This is not an overall improvement over the straight 2% resin of Example XXIV, which showed 134 pounds dry and 29.4 pounds wet. However, there was better wet abrasion resistance and a higher degree of water repellency.

Example XXVI

The resinous materials of the invention were applied to paper as a tub size in proportions of 0.5% to 5% by weight. After solutions of the resin were coated on the paper, the paper was dried and the resultant product had improved wet and dry strength.

Example XXVII 100 grams of bleached kraft pulp was dispersed in 1½ gallons of water to produce a product designated (a). Another 100 grams of bleached kraft pulp was dispersed in the same way and treated with 2% by weight (based on the dry fiber) of the resin of Example VII(b). This product was designated (b).

Cellulose mats were prepared by pouring the fibrous slurries (a) and (b), respectively, through Buchner funnels. These mats were tested wet in place and fresh ones were made for each test.

100 grams of blue polyester resin paste was dissolved in 50 grams of xylene and 50 grams of methyl ethyl ketone. 10 grams of sodium tetradecyl sulfate, 4 grams of 28% ammonia and 200 grams of water were added. This mixture was made into an emulsion and stirred before each use. 50 grams of this emulsion was then diluted with 200 grams of water and this was used as a test emulsion by passing it through the cellulose mats made from the slurries (a) and (b), respectively in order to determine how many passes were required to remove the polyester resin from the emulsion. It was found that the polyester resin could be removed in two passes with the mat made from (b) and five passes were required with the mat made from the untreated fibrous slurry (a).

Another method of demonstrating the power of the altered cellulose fiber to attract a polyester resin was to stir 25 grams of the treated cellulose from slurry (b) into the diluted emulsion. The colored polyester resin promptly deposited on the treated fiber leaving clear water. The fibrous mass was then poured onto mats made from (a) or (b) to separate the deposited material.

From the foregoing examples it will be seen that the oil wettability imparted to the surface of anionic fibers, such as cellulose, provides an important property not previously possessed by the cellulose and makes the resultant product useful for purposes where cellulose is not satisfactory as such. Thus, treated cellulose fibers of the present invention can be used in making filter paper for cigarettes to remove tars and other noxious substances.

PRODUCTS OBTAINED BY ADDING OTHER SUBSTANCES TO MATERIALS WHICH HAVE BEEN ALTERED BY THE PRACTICE OF THE INVENTION

When cellulose or other anionic materials are treated with resins of the type herein described, the resultant treated product is characterized by the ability to bond or adhere to a large number of substances which ordinarily will not bond to such anionic materials. Examples of such substances have previously been mentioned and include polystyrene, petroleum resins, oleo-resinous varnishes and polyester resins. These materials are oil soluble and do not ordinarily bond directly to cellulose. It has been very difficult heretofore, therefore, to apply such materials to cellulose in a beater treatment where the cellulose is dispersed in an aqueous slurry and the material it is desired to apply is added to the slurry. One type of substance where difficulty has been encountered particularly is the polyester resin.

In order to demonstrate the application of the invention tests were made, as shown by the following examples.

*Example XXVIII*

20 grams of bleached kraft pulp was opened by mixing in 1500 grams of water at a specified temperature and the resin of the invention added. The quantities of resin used were ordinarily .5% to 5% by weight of the cellulose on a dry basis. Then, with good mixing, 5 grams of pigmented polyester resin solution was poured into the aqueous slurry containing the treated cellulose fiber. For this particular test a commercial uncured thermosetting polyester resin was used known as Reichhold Polylite 8039. 300 grams of this resin were mixed with 35 grams of pigment paste, 45 grams of xylene and 45 grams of methyl ethyl ketone.

In each test the fiber and resins were mixed vigorously for at least 10 minutes. The colored fiber was then examined and rated according to the following scheme. A high number indicates good efficiency in bonding the polyester resin to the fiber.

(1) Colored resin is immediately centrifugally thrown to beaker walls. None on fiber.
(2) Colored resin appears in fiber as coarse drops.
(3) Colored resin appears in fiber as fine drops.
(4) Color appears to go smoothly on stock, but 10 minutes mixing shows resin on beaker at stirrer level.
(5) Colored resin appears to go on stock but on pressing and drying a pad, color is seen to be weak and under the microscope is found to be in fine drops.
(6) Colored resin goes on stock to give a bright smooth color which is maintained on drying a pad.

In the foregoing test a well known commercial cationic methylol melamine resin rates 4 on the scale given when used at a concentration of 3% by weight of the fibers. It is considered that this resin only does half what is desired. It reduces the charge on the cellulose fiber but does not impart oil wettability that is necessary for complete effectiveness.

A typical fatty amine, such as dodecylamine, when used at a concentration of 3% by weight of the cellulose also rates 4 in the test. This amine, and other similar amines, have a certain directing action that will make resins add to an anionic fiber to some extent, i.e., a preliminary good distribution of colored resin on the fiber in the test will be followed by resin globules reforming and being thrown out on the sides of the beater. It is considered that uncured polyester often acts as a solvent, dissolves the directing material adsorbed on the fiber and then both leave the fiber. The resins of the invention avoid these objections. They are water soluble cations that deposit on the cellulose fiber. They are high enough molecular weight to permit easy adsorption to take place. They do not dissolve in solvents in the presence of water. There is evidence also that they react with cellulose and thus are chemically attached. They carry oil wetting or lipophilic areas to alter the wetting of the fiber as desired.

The Adduct A of Example II(a) and the resins of Examples VIII and IX were evaluated in the foregoing test using different temperatures to apply them to cellulose fibers with the following results.

|  | Temperature of Stock, Degrees F. | | | | |
|---|---|---|---|---|---|
|  | 120 | 140 | 160 | 180 | 200 |
| Adduct A (Example II(a)) |  | 4 | 4 | 4 | 6 |
| Resin of Example VIII |  | 6 | 6 | 6 | 6 |
| Resin of Example IX |  | 6 | 6 | 6 | 6 |
| Methylol Melamine (parez 607) | 4 | 4 | 4 | 4 | 4 |
| Control | 2 | 2 | 2 | 2 | 2 |

It will be seen from the foregoing results that heating improves the effectiveness of the resins of Examples VIII and IX but has no effect on methylol melamine. All treatments were made with 5% by weight of the resin added to the cellulose on a dry basis. The same treatment was used for methylol melamine.

The Adduct A (Example II(a)) is a cation and carried lipophilic groups. It is relatively low molecular weight, 753 (by the method of formation) and hard to adsorb. Since a slight excess of diepoxide was used, there can be a few molecules with active oxirane ring present and these will polymerize at the higher temperature to give a few molecules at 1128 molecular weight units and these account for the activity at 200° F. The addition of formaldehyde as in Examples IX and X causes polymerization so the resin is effective at lower temperatures.

*Example XXIX*

The test procedure of Example XXVIII was repeated with the resin of Example II(a) by adding 2% by weight of said resin to cellulose and heating the aqueous slurry containing the cellulose and resin for 5 minutes to a temperature of 120° F. This gave a rating of 6. A lower rating was obtained at lower temperatures.

*Example XXX*

The test procedure of Example XXVIII was repeated with an altered cellulose prepared by mixing an aqueous slurry of cellulose with 2% by weight of the cellulose of the resin of Example II(b) at 70° F. for 10 minutes. The altered cellulose rated 6 according to the test.

*Example XXXI*

The test procedure of Example XXVIII was applied to an altered cellulose obtained by mixing 2% by weight of the resin of Example X with an aqueous slurry of cellulose fibers, based on the dry weight of the cellulose for five minutes at 70° F. The resultant altered fibers rated 6.

Example XXXII

An aqueous slurry of cellulose was mixed with a resin of Example XI for 10 minutes at room temperature and another aqueous slurry of cellulose was mixed with a resin of Example XI for 10 minutes at 140° F. The amount of resin was sufficient to add 0.9% by weight of resin, based on the dry weight of the cellulose. The altered cellulose made at room temperature rated 5 and the altered cellulose made at 140° F. rated 6 when tested by adding a polyester resin thereto according to the test given in Example XXVIII.

Example XXXIII

Cellulose fiber was altered with 1% by weight of the resin of Example VIII without formaldehyde and with formaldehyde.

Resinox 594 was used as a beater addition on altered fiber. This is a liquid (65% total solids) one step phenolic resin sold by Monsanto Chemical Company. The phenol formaldehyde resin was dissolved in water for this test by adding 10 parts NaOH to 100 parts resin solids. This solution was distributed in the treated fiber by stirring and at 140° F. precipitated by bringing the pH to 6 with dilute hydrochloric acid. The resin addition was 20 parts per 100 parts of cellulose fiber. A clean precipitation with clear white water was obtained in each case. The stocks were felted into test pads and dried in a flat die at 50 p.s.i.

The following test results were obtained:

| Grams Formalin Added to Resin of Example VIII | Breaking Flexural, p.s.i. | Unnotched Izod Impact | 24 Hour Water Pickup, percent |
|---|---|---|---|
| 0 | 7,350 | 3.9 | 23.5 |
| 8 | 10,700 | 3.8 | 25.0 |
| 14 | 10,700 | 3.7 | 25.3 |
| 20 | 9,700 | 3.6 | 25.3 |
| 30 | 10,250 | 4.9 | 32.0 |

It is apparent that the methylol groups introduced by formaldehyde into the resin of the invention improved the strength found in a condensation resin beater treatment.

Example XXXIV

The resin of Example III(a) was added to cellulose in aqueous slurry at 160° F. in proportions to give a product containing 3% by weight of the resin based on the dry weight of the cellulose. The resultant product readily bonded to an uncured polyester resin in an aqueous slurry and gave a rating of 6 when tested as described in Example XXVIII.

Example XXXV

The resin of Example III(b) was treated with 14 grams of formalin and when 5% by weight of the resultant resin was added to cellulose in an aqueous slurry at 140° F. the altered cellulose bonded to polyester resin and rated 6 according to the test given in Example XXVIII.

Example XXXVI

The resin of Example III(c) when added to cellulose at 150° F. in an aqueous slurry using 1.5% of the resin, based on the dry weight of the cellulose, gave a product which readily bonded to a polyester resin and rated 5 according to the test procedure given in Example XXVIII. With the addition of 10 grams of formalin to the resin of Example III(c) and otherwise carrying out the procedure under the same conditions, the product rated 6 according to the test procedure of Example XXVIII.

Example XXXVII

The resin of Example IV(a) remained stable after one month's storage at 10% total solids. An aqueous slurry of cellulose treated with this resin at 100° F. in proportions sufficient to add 2% by weight of the resin to the cellulose, based on the dry weight of the cellulose, and then treated with polyester resin in accordance with the procedure in Example XXVIII rated 6 by the testing procedure.

Example XXXVIII

The resin of Example IV(b) when added to cellulose at 120° F. in proportions of 1.5% by weight of the resin, based on the dry weight of the cellulose, gave a rating of 6 according to the test in Example XXVIII.

Example XXXIX 1.4% by weight of the resin of Example IV(e) when added to a slurry of cellulose at 120° F. altered the cellulose to a rating of 6 according to the test procedure given in Example XXVIII.

Example XL

The resins prepared as described in Examples V(a) through V(e) all rated 6 when applied to cellulose fiber and tested as described in Example XXVIII. The resin of Example V(f) rated 3 under the same conditions. This indicates that a molar ratio of diepoxide to polyamine of 3:1 is too high to give a resin having the desired altering characteristics. However, a molar ratio within the range of 0.85:1 to 2.5:1 was satisfactory.

Example XLI

1% by weight of the resin of Example VI rated 6 according to the test of Example XXVIII when applied to a cellulose fiber slurry at 160° F.

Example XLII

2% by weight of the resin of Example XVI added to an aqueous slurry of cellulose at 70° F. rated 5 according to the test procedure of Example XXVIII and 6 after the addition of 10 grams of formalin.

Example XLIII

Tray preforms were made with cotton linters and one inch sisal fiber 50–50 by weight. (a) The control was untreated; (b) the fibers were treated with 2% of the butadiene diepoxide resin of Example IV(a) at 140° F.; (c) the fibers were treated at 140° F. with 2% of the allyl resin prepared above as in Example XVI. These samples were made into tray preforms and dried. Both (b) and (c) were substantially stronger due the binding action of the treating resins. The preforms were molded at 200 p.s.i. in a trimming die with pour on of catalyzed Reichhold polyester 8039. Resin ratios found by weight were 70 parts resin to 30 preform. The control showed bad cellulose haze and would be unacceptable commercially. (b) was much better in this respect, and (c) showed perfect wetting out by the resin. 24 hour water pickups on 4 x 4 inch samples with cut edges were (a) control 2.5%, (b) butadiene diepoxide resin 1.1%, and (c) allyl altering resin 0.8%.

Example XLIV

The resin of Example XX was treated with 10 grams of formalin. Two parts of this resin was added to white kraft opened in water at 100° F., and after five minutes of mixing the pad was felted and die dried at 400° F. and 50 p.s.i. This was quite water repellent in contrast with a control pad which instantly blotted up water.

3% of the resin was added to a black colored radio speaker diaphragm stock and made into a speaker cone by felting and drying. This was water repellent and when soaked was wet strong. It was considered that the usual lacquer dip could be eliminated with this beater treatment.

Example XLV

The following material was opened in a breaker at 180° F.:

| | Pounds |
|---|---|
| Unbleached kraft | 25 |
| Papermakers' rag | 10 |
| Shredded wood | 10 |
| One inch fiberglass | 5 |

To this was added 1 pound (dry basis) of the resin of Example I to alter the fiber to oil and solvent wetting. 19 pounds of phenol formaldehyde resin (Resinox 594) at 65% total solids was dissolved in 15 pounds of methyl isobutyl ketone and poured into the mixing breaker. In five minutes the resin had beaten onto the fiber and the breaker (at 4% consistency) was chilled and diluted and pumped to a stock chest at 1% consistency (1% by weight fiber in water). The stock was next pumped to a felting tank at ½% consistency and felted into luggage preforms. These were pressed and die dried at about 100 pounds per square inch (p.s.i.) and 450° F.

Test pads dried at 50 p.s.i showed 7000 breaking flexural and 6 unnotched Izod impact. A luggage shell showed the following:

| | Density | Flexural, p.s.i. | Impact | 24 Hour, Water Percent | Swelling, Percent |
|---|---|---|---|---|---|
| Side | 0.9 | 15,700 | 6.4 | 30 | 6 |
| Top | 0.9 | 11,300 | 4.5 | 45 | 8 |

This demonstrates the ability of the resin of the invention make fiber take a solvent dissolved resin.

Example XLVI 5 pounds of bleached kraft was opened in water in a laboratory beater at 140° F. 2% of the resin of Example I was added. A sample of the stock was checked and found to be changed to oil wetting. The pH of the stock was raised to 9 with ammonia and 1¼ pounds (dry basis) of synthetic rubber (GR-S latex) at 40% total solids poured in. The beater was allowed to circulate 10 minutes and the water cleared except for a slight milkiness. Lowering the pH to 5 made the water completely clear. This stock was made into paper where it showed a desirable flexibility and toughness. The distribution of the rubber was good and the paper produced showed no rubber particles.

Example XLVII

An aqueous slurry of cellulose and glass fiber rovings was made at 150° F. at a consistency of 4% by weight fiber from the following:

| | Pounds |
|---|---|
| Northern kraft | 180 |
| Refined rag | 30 |
| Shredded wood | 60 |
| Glass fiber, one inch | 30 |

This was altered to solvent wetting by adding the following resin:

700 grams diepoxide made by reacting 2 moles of epichlorhydrin with one mole of dihydroxy diphenyl dimethyl methane
700 grams tetraethylene pentamine were mixed, heated to 120° F. and allowed to go through the oxotherm period. After the resin had cooled to 160° F. it was dissolved in 1700 grams of isopropyl alcohol and 350 grams of Epon 828. The temperature was held at 160° F. for 15 minutes until the viscosity build up indicated incipient gelation (lumpy gel masses falling from stirrer). The reaction was then stopped by diluting with a solution of 7000 grams of water and 700 grams of 28% by weight hydrochloric acid. After allowing this to stand 15 minutes, 400 grams of formalin was stirred in and the resin solution at pH 8.5 was allowed to stand overnight.

A sample of stock taken from the treated beater rated 6, or completely changed to oil wetting.

The breaker was allowed 10 minutes at 150° F. for thorough adsorption of the treating resin. 20 parts by weight of phenolic resin was now added for every 100 parts of fiber as follows:

6 pounds of caustic soda was dissolved in 2 gallons of water and poured into 93 pounds of Monsanto Resinox 594 (at 65% total solids). One gallon of ethyl alcohol was added and the mixture thoroughly stirred. This was added to the breaker and thoroughly mixed. 10% of hydrochloric acid was added slowly to a pH of 6. The phenolic resin precipitated in small particles which were liquid at this temperature. These solvent soluble liquid particles immediately were taken up by the altered fiber. The water in the breaker was crystal clear in five minutes. Distribution of the resin on the fiber was perfect. After 15 minutes dwell, the stock was pumped to a stock chest, being diluted from 4% to 1% consistency in the process. The temperature dropped from 150° F. to 80° F.

The stock was pumped to a felting tank and luggage pieces felted and die dried. A 760 gram luggage shell showed 12,400 p.s.i. flexural on the side and 10,500 p.s.i. on the top. Side unnotched Izod impact was 5.5 and top Izod 6.1. 24 hour water pickup (on 4 x 4 inch samples, all edges cut) was 20.5% on the side and 20.4% on the top.

In conventional production, luggage shells, which are dipped in varnish and oven cured, run 9000 p.s.i. flexural and 8 unnotched Izod, with about 50% water pickup in 24 hours. Hence, the altered fiber treatment is a substantial improvement over conventional production.

When the phenolic resin is run without the treating resin to alter the wetting of the fiber there is a great tendency to foam because of small particles of free resin. As the stock is pumped in the system other resin (which may be on the fiber momentarily after the precipitation process) works loose. This collects in the foam and deposits on the top of the molded article. The resin rich surface of the preforms starts sticking to the drying dies and the phenolic trials ordinarily last no more than ½ hour before they no longer can be run.

Example XLVIII

The procedure was the same as in Example XLVII except that 2½ pounds of dodecylamine was added at pH 6 and 150° F. after the phenolic resin addition. This prevented loss in water resistance. Tallow amine or other fatty amines can be used in a similar manner. The amine groups apparently react with the methylol groups. A slow reaction occurs at 150° F. in the breaker, and a rapid reaction as the piece is dried. This process turns the fatty radical outward and gives a well sized part.

Example XLIX

The resins of the invention can be used to produce beautifully even colored fibers. 10 pounds of cut sisal fiber was stirred in 40 gallons of water at 140° F. and 90 grams of the formaldehyde resin of Example IX poured into the water. This was followed by 500 grams of polyester resin (Reichhold 8039) containing 50 grams of pigment red polyester paste and catalyzed with 1% benzoyl peroxide, ½% cobalt drier and 1% methyl ethyl ketone peroxide. After the stirring had distributed the color evenly on the treated fibers, the temperature of the water was raised to 180° F. and the polyester resin cured. This eliminated the stickiness of the fiber.

Different color batches were made and mixed. These were dispersed with beaten white kraft pulp, felted and die dried into phonograph cabinets.

In a similar manner, the process can be used to dye cloth, in particular, by printing the resins of the invention on cloth, agitating in an aqueous slurry containing pigmented lipophilic resin and curing, if necessary.

Example L

A block of pulp containing a shaped cavity on one side was pressure felted from 50 unbleached northern kraft and 50 shredded wood. This was dried in an oven and used to protect glass goblets for shipping.

It was found necessary to increase the strength of the package so that it would bear at least 100 pounds without crushing. Dipping with dilute oleoresinous material dissolved in naphtha satisfied the requirements, but was not feasible to carry out. The mass of pulp absorbed large quantities of the dilute varnish, making this an extreme explosion hazard in the oven as the solvents came off.

It was found possible to incorporate 5% of the oleoresinous varnish by pouring a 75% total solids solution into the stock in the beater after first adding 1% of the resin of Example I. With this resin (but not without) the varnish beat onto the stock easily. After felting, oven drying, and curing, hard blocks of pulp which more than satisfied the shipping requirements were obtained.

Example LI

In preparing a trash container from molded cellulose fiber which was to be left out in the weather, it was found necessary to impregnate the die dried preform in 25% catalyzed colored polyester resin (Reichhold 8039) in an acetone solution. When freshly dipped, the color penetrated to the center of the cellulose mat, but on drying the color and resin migrated to the surfaces before curing. This left the center fibers unprotected and caused failure when the container was exposed to rain.

Using 2% of the resin of Example XVI on the pulp before forming practically eliminated the movement of the resin. This is due to the more complete wetting of the fibers and improved affinity for resin. The water pickups in a test were reduced from 35% to 25% by this procedure.

Example LII (a) 15 pounds of southern kraft, 5 pounds of ground wood, 3 pounds of sulfite and 2 pounds of cotton linters were opened in a beater and then, with the roll "brushing" the bed plate beaten until Williams' freeness was 120 seconds. 1.25 pounds (dry basis) of the resin of Example XVIII was then added and well mixed with the stock. Cones made by felting this stock and oven drying it would hold water for two hours (duration of the experiment) without losing form and without the underside of the cone becoming wet. Without the resin treatment the cones collapsed within 15 seconds when filled with water. The treated cones when built into radio speakers had the typical response of the lacquer dipped control.

(b) In a second trial the stock was beaten in the same manner and after adding 1% of the altering resin of Example VIII plus 10 grams of formalin the temperature was taken to 180° F. with a steam hose. At this temperature it was observed that the fibers took the colored test resin readily. The stock was cooled to 120° F. and 5 pounds of a 50% total solids oleoresinous varnish was poured in. The varnish solvent was mineral spirits. The solids portion consisted of ⅓ raw tung oil, ⅓ rosin and ⅓ of a hard petroleum resin. As the stock was stirred, it was observed that the varnish went onto the fiber, leaving clear water. The stock felted without sticking either on the felter or on drying forms. Two hours in the oven at 300° F. or two days air drying were required to complete the cure of the varnish, after which the cones were highly water repellent and wet strong, with a good sound response.

Example LIII 200 grams of bleached kraft was opened in 15,000 grams of water at 180° F. and treated with 2% of the resin of Example I (based on the cellulose) and the stock allowed to cool to 120° F.

A pigmented resin solution was made by grinding on an ink mill.

|  | Grams |
|---|---|
| Uncured polyester resin (Reichhold 8039) | 1000 |
| Magnetic iron oxide (IRN–110) | 600 |

As required, solvent was added to keep the viscosity within bounds. Final composition of the mix included 300 grams methyl ketone and 200 grams xylol. The pigmented resin was catalyzed before use with 1% benzoyl peroxide, ½% cobalt drier and 1% methyl ethyl ketone based on the polyester resin.

200 grams of the catalyzed pigmented resin was slowly added to the vigorously stirred cellulose slurry at 120° F. with smooth deposition on the fibers and the temperature taken to 180° F. The polyester resin cured at this temperature, as was shown by the disappearance of tackiness in the stock. The fibers were colored brown and the water was clear. Portions of the stock were dried and found to be vigorously attracted by a magnet. Dilute dispersions could be stirred by rotating a magnet under a beaker containing the dispersion.

Example LIV

An unsized uncalendered sheet of 50 kraft–50 cotton linters was impregnated with polyester resin, placed in a tray die and molded. When the paper was first tub sized with a ½% solution of the allyl resin of Example XVI and dried, it was found to have improved wet and dry strength. Tearing of the impregnated paper on closing the mold was reduced. Improved wetting of the fibers showed up as higher translucence of the molded piece. Small blisters were eliminated.

Example LV 150 grams of bleached kraft pulp was rendered oil wetting by 2% of the formaldehyde resin of Example VII(a) at 160° F. 200 grams of catalyzed foaming polyurethane (Pelron) containing 60 grams of methyl ethyl ketone were poured into the stirred stock. The foamed fiber material was mixed with 50 grams of opened kraft pulp and given vigorous agitation. This when felted was a bulky (0.1 gram/cc.) coherent pad, suitable, when dried, for insulation.

Example LVI

The altering resin was made by heating 30 grams of tetraethylene pentamine with 30 grams of Epon 828. After the reaction had subsided the mass was dissolved in 100 grams isopropyl alcohol and 10 grams of Epon 828 added. This was held at 150° F. for 20 minutes until viscosity buildup indicated gelation. It was then dissolved in 200 grams of water and 18 grams of 28% by weight hydrochloric acid. The resin was diluted to 10% solids for storage.

20-gram portions of bleached kraft were opened in 1500 grams of water at 120° F. 2.5% of the dry resin, based on the cellulose, was added (0.5 gram dry or 5 grams wet), and the pH was adjusted with 5% caustic soda or 5% hydrochloric acid. The temperature was taken to 180° F. The stock was then filtered out and worked up in 1500 grams, 120° F. fresh water and the pH adjusted to 7.5 grams of the colored polyester resin was added with vigorous stirring and this was continued for 10 minutes. Pads were felted and rated as described in Example XXVIII.

The results were as follows:

| Reaction pH of the altering resin— | Rating |
|---|---|
| 2 | 6 |
| 5 | 6 |
| 7 | 6 |
| 9 | 6 |
| 10 | 6 |
| 12 | 6 |

Example LVII 10 pounds of bleached kraft was opened in 500 gallons of water at 140° F. and 100 pounds of glass fiber roving out to ¾ inch lengths poured in. This was immediately followed by 15 pounds of polyester resin (Reichhold 8039) catalyzed with 1% benzoyl peroxide, ½% cobalt drier (6% metal) and 1% methyl ethyl ketone peroxide. Stirring was continued to cause the polyester resin to go on the glass and the temperature was raised to 180° F. to cure the resin and remove the tackiness from the fiber.

The batch was now dropped to a screen and most of the hot water drained off for re-use. The fiber was transferred to a stock chest and diluted to 1% consistency. 3 pounds on a dry basis of the allyl resin of Example XVI was stirred in.

This gave a stronger preform and better wetting out when the wet-formed oven dry preforms were molded with polyester resin.

Example LVIII

The following cellulose stock was dispersed in a breaker at 145° F.

| | | |
|---|---|---|
| Ground wood | sheets | 10 |
| Northern kraft | do | 50 |
| Blue rag | pounds | 40 |
| Shredded wood | do | 40 |

The stock was altered to oil wetting by adding 2½ gallons of reagent (1). Reagent (2) was then added. After this was well mixed, caustic soda dissolved phenolic (3) was added and then precipitated with acid. The batch was diluted with cold water and pumped to a stock chest.

A molded luggage shell made from this stock had a density of 0.82 to 0.9 gram per cc. flexural top 8700 p.s.i., impact 5.7, flexural side 8400 p.s.i., impact 5.3, and 24 hour water pickup 33%. This shell held water 5 days without weakening or leaking at which time the test was ended.

The reagents (1), (2) and (3) were made as follows:

(1) 600 grams tetraethylene pentamine was heated with 600 grams Epon 828 and allowed to exotherm. This was dissolved in 1500 grams isopropyl alcohol and 300 grams of Epon 828 was added. The solution was held at 120° F. for ½ hour until bodied and diluted with water and 600 grams 28% by weight hydrochloric acid to 5 gallons, and 300 grams formalin added.

(2) 7 pounds crude dicyclopentadiene resin Amoco Chemical (Panarez 7-70) at 70% total solids, and 23 pounds of scrap polystyrene at 44% total solids in xylol and naphtha mixed together in equal parts.

(3) 480 grams caustic soda dissolved in ½ gallon of water and stirred with 16 pounds phenol-formaldehyde resin (Resinox 594) and 4 pounds isopropyl alcohol.

The acid precipitation of the phenolic was effected by adding to the breaker 1450 cc. of 28% by weight hydrochloric acid. Conventional defoaming agents (decyl alcohol, tributyl phosphate and Dow Corning antifoam B) were used to control the foaming.

The resultant altered cellulose contains 1% altering resin (epoxidized precondensate), 3% dicyclopentadiene, 5% polystyrene and 7% phenolic based on the dry fiber.

Reagent (2) does not distribute on the fiber unless reagent (1) is first used.

Example LIX

This example illustrates the application of the invention to the altering of cellulose fiber so that it will have an affinity for polystyrene.

The cellulose fiber consisted of 20 grams of bleached kraft cellulose which was opened to form a slurry by mixing in 1500 grams of water.

The altering resin was prepared by allowing 100 grams of tetraethylene pentamine and 100 grams of Epon 828 to react. The product was then dissolved in 250 grams of isopropyl alcohol and 50 grams of Epon 828 was added. The solution was allowed to ripen to incipient gelation at 125° F. The resultant product was then dissolved in 100 grams of water plus 100 grams of 28% by weight hydrochloric acid and 50 grams of formalin was added. The product was diluted with water to 10% solids.

4 grams of the altering resin as previously described (2% by weight of the cellulose) was mixed with the slurry of cellulose at 120° F. for 5 minutes, then 10 grams of polystyrene was added. The polystyrene was colored and was prepared by mixing 100 grams of a 44% total solids solution of polystyrene in equal parts of xylol and naphtha with 20 grams of xylol, 130 grams of acetone and 5 grams of oil black dye.

The polystyrene was added to the stirred cellulose slurry containing the altering resin at 120° F. and bonded to the altered cellulose fiber immediately. It retained its affinity for the cellulose fiber as the temperature was raised to 180° F. A very uniform product was obtained.

The colored polystyrene will not attach itself to the untreated cellulose fiber.

Example LX

The procedure was the same as in Example LIX except that 10 grams of uncured polyester thermosetting resin (Reichhold 8039) was added to the mixing slurry of altered cellulose fiber prior to the addition of the polystyrene. The polyester resin attached itself to the altered cellulose fibers immediately and the polystyrene resin readily attached itself to the polyester resin-altered cellulose fiber as mixing was continued.

Example LXI

Cellulose in an aqueous slurry was altered as described in Example LIX by adding an epoxidized precondensate and the slurry was then treated with 10 grams of polyester resin and 1 gram of tall oil fatty acids. The resultant stock when dried showed a pronounced sizing effect.

Example LXII

Propylenediamine having the formula

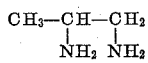

was reacted with Epon 828 in a molar ratio of 2:1 by mixing together 15 grams of propylene diamine and 38 grams of Epon 828. The exothermic reaction was allowed to take place and the mixture became very heavy and partially gelled. It was disolved in 35 grams of methyl ethyl ketone. The resultant solution was then filtered and 66 grams of solution were recovered (40 grams solids). To this was added 15 grams Epon 828 and the solution was ripened at 160° F. for 20 minutes. It became very viscous. The heavy solution was poured into a mixture of 200 grams water with 20 grams 36% hydrochloric acid. A white precipitate formed which immediately dissolved. The pH was 6. 7 grams formalin was added. This gave a heavy solution having a resin solids content of 18% by weight. 5 grams of this solution was mixed in 20 grams of white kraft pulp dispersed in water at a consistency of 4.5%. The resultant cellulose fiber was then tested as previously described herein to determine whether the fiber would accept polyester resin. This test showed that the resin would not alter the fiber even when the slurry was heated at 150° F. and again at 180° F.

Additional tests were made to determine the wet strength properties of the resin. This was done by making a 20 gram addition of the resin solution to 150 grams of opened bleached kraft pulp in an aqueous slurry of 2.4% consistency at room temperature, then felting pads from this slurry and die drying for 5 minutes at 350° F. and 25 p.s.i. A tough pad was obtained which showed considerable water repellency and held water droplets for 10 minutes. After 2 hours soaking the pad was still tough, though pliable, while a bleached kraft control had zero tear strength. This test showed that the resin made from propylene diamine imparted excellent wet strength properties to cellulose.

*Example LXIII*

710 grams of Epon 828 and 720 grams of tetraethylene pentamine were allowed to react exothermically until the reaction had subsided.

1430 grams of the resultant adduct were then dissolved in 1070 grams of methyl ethyl ketone and 357 grams of Epon 828 were added giving a resin solution containing 62.5% total solids. This was allowed to stand or ripen at 130° F. for 30 minutes and samples were taken from the ripening solution at intervals during this time. 600 gram samples of the ripening solution were dissolved in each case in 1500 grams of water to which had been added 150 grams of 28% hydrochloric acid. The resultant aqueous solutions therefore contained 16.7% resin. The viscosity increased on ripening as shown by the following table.

TABLE I

| Sample | | In Methyl Ethyl Ketone Centipoises at 130° F. (62.5% Total Solids) | In Water Centipoises at 85° F. (16.7% Total Solids) |
|---|---|---|---|
| A | Adduct | | 18 |
|   | 2d addition | 120 | |
|   | 2d addition 5 minutes at 130° F. | 125 | |
|   | 2d addition 12 minutes | 160 | |
|   | 2d addition 21 minutes | 220 | |
| B | 2d addition 30 minutes (Clear point) | 300 | 28 |
| C | 2d addition 38 minutes | 500 | 30 |
| D | 2d addition 45 minutes | 840 | 34 |
| E | 2d addition 51 minutes | 1,350 | 38 |
|   | 2d addition 65 minutes | (¹) | |

¹ Off range.

Resins containing formaldehyde were also prepared by adding formalin solution (37% formaldehyde in water) to the initial adduct of the Epon 828 and tetraethylene pentamine using a ratio of 1 gram of formalin solution to 2 grams of tetraethylene pentamine. In this way, products F, G, I, I and J were obtained by adding formalin solution to Samples A, B, C, D, and E. These products had the following viscosities

TABLE II

In water, cps. at 85° F.
Formalin: (14.8% total solids)
F _____ 18
G _____ 28
H _____ 30
I _____ 40
J _____ 48

The A to E resins had the epoxide equivalents shown in the following table.

TABLE III

| Sample | Percent Epon 828 | Expoxide Equivalent by Infra Red Analysis |
|---|---|---|
| A | 8.75 | 2,150 |
| B | 17.0 | 1,100 |
| C | 14.4 | 1,300 |
| D | 12.8 | 1,360 |
| E | 11.2 | 1,680 |

The foregoing resins were found to have cellulose altering ability. This ability was especially evident in resins B to J.

These resins were also tested and found to impart water repellency and wet strength to cellulose fibers. Resin A produced 3 to 5-fold increase in water repellency of cellulose fibers and 3% of resin A produced a 2-fold increase in wet strength as compared with the untreated cellulose. Resins B to J in proportions of 1 to 3% based on the dry weight of the cellulose also increased water repellency and in some cases gave a remarkable increase in both wet and dry strength. For example, 1% of resin B gave a wet strength and a dry strength which were both higher than the original dry strength of the fibers.

ALTERED STARCH PRODUCTS

The following example illustrates the use of the epoxidized precondensates of the invention in modifying the properties of starch products.

*Example LXIV*

50 grams of potato starch was stirred into 450 grams of cold water and gelatinized by heating to 155° F. This was repeated including 5% of the resin of Example I, dry basis on the starch. In comparison with the control, this exhibited a tapioca behavior, being long and keeping its tack until almost dry. The control was short and lost tack on working. The control retrograded rapidly, while the treated starch did not.

A water soluble phenolic resin (Catalin CR–246) at 64% total solids was added to each sample 50–50. The phenolic mixed easily with the regular starch but turned the altered starch into a white opaque long gel. This is considered to be mutual precipitation between high molecular weight anions and cations and is evidence that the procedure results in a cationic starch.

It will be recognized that the invention is susceptible to some variation and modification in the manner of its practical application. While various types of substances have heretofore been proposed for altering anionic fibers, such as cellulose, it is believed that the altering resins prepared in accordance with the present invention are outstanding in their properties and produce results not heretofore obtained.

In the foregoing description where reference has been made to polyester resins, it will be understood that these resins are made by reacting a polyhydric alcohol and a polybasic acid or acid anhydride and contain unsaturated components which are capable of cross linking when the resin is cured. Usually at least a portion of the acid component is maleic anhydride. The polyhydric alcohol-polybasic acid composition is added to 10 to 40% by weight of a monomeric aryl vinyl compound, such as styrene or vinyl toluene. For example, a relatively rigid or non-flexible resin can be prepared by reacting 2 moles of ethylene glycol with 1 mole of phthalic anhydride and 1 mole of maleic anhydride for 2 to 4 hours at a temperature of 160° C. in an inert atmosphere such as nitrogen, carbon dioxide or illuminating gas and then adding to the resultant product 10 to 40% monomeric styrene. The resin in this form is liquid and usually has an acid number around 10 to 50. When this liquid resin is heated with a curing catalyst a solid, infusible resin is formed.

Suitable catalysts are the organic peroxides which are soluble in the hydrophobe or resin phase, e.g., benzoyl peroxide acetylbenzoyl peroxide, cumene hydroperoxide, para-tertiary butyl perbenzoated, and other oil soluble oxygen supplying catalysts.

Other ethylene or propylene glycols, including polyethylene and polypropylene glycols, can be used instead of ethylene glycol provided they produce water insoluble polyesters. Other dicarboxy acids can be used, e.g., adipic acid is a good flexibilizer.

Instead of styrene other monomeric aryl compounds having an unsaturated side chain can be employed, e.g., vinyl toluenes, vinyl naphthalenes, vinyl ethyl benzenes, alpha methyl styrene, vinyl chlorobenzenes, vinyl xylenes, divinyl benzene, divinyl toluenes, divinyl naphthalenes, divinyl xylenes, divinyl ethyl benzenes, divinyl chlorobenzenes, divinyl-phenyl-vinyl ethers and diallyl phthalate. Lower boiling monomers such as vinyl acetate usually are not satisfactory because the reaction which takes place when the resin is cured is very exothermic and the heat would drive off low boiling monomers.

From the foregoing description it will be seen that the new resins of the invention can be classified in several ways, namely, (1) Epoxidized precondensates of polyamines and polyepoxides,
(2) Formaldehyde condensation products of precondensates of polyamines and polyepoxides,
(3) Formaldehyde condensation products of (1),
(4) Resins, of (1), (2) or (3) containing unsaturated reactive groups,
(5) Resins of (1), (2) or (3) containing long chain fatty amines.

The polyamines used in making these resins contain at least two reactive amino groups (i.e., contain at least two amino nitrogens with hydrogen atoms attached). To make altering resins they should contain at least four carbons. Polyamines with less than four carbon atoms give wet strength resins. Aliphatic polyamines give the best resins. Aromatic polyamines are preferably employed in conjunction with aliphatic polyamines.

The polyepoxide preferably has an epoxide equivalent of 43 to 1000.

The adduct formed initially from the polyamine and the polyepoxide is made by reacting a polyamine and a polyepoxide in the approximate proportions of two reactive amino groups per epoxy group. The exothermically formed adduct is preferably further epoxidized to increase the number of epoxy groups. The additional epoxide groups are preferably sufficient to give a molar ratio of epoxy to reactive amino groups of 0.85:1 to 2.5:1.

In the formaldehyde condensation, the ratio of formaldehyde (either in formalin solution, or as formaldehyde gas or from para-formaldehyde or other formaldehyde liberating compound) is 0.25 mole to 15 moles HCHO per mole of reactive amino groups (e.g., 0.5 mole to 30 moles of HCHO per mole of an aliphatic diamine).

The resins of the invention are usually prepared as thickened solutions short of gel formation. The solutions are usually aqueous solutions and such solutions can have varying pH's, for example, pH 2 to pH 12, by adjusting the acid and alkali concentrations with acids and alkalis which do not precipitate the resins, e.g., those having monovalent anions and cations, respectively. Non-aqueous solvents can also be used to dissolve the resins and these solvents can be water miscible, water immiscible, or mixtures of water miscible and water immiscible solvents. Examples of such solvents are isopropanol, acetone, methyl ethyl ketone, methyl isobutyl ketone, and mixtures of methyl isobutyl ketone and acetone. The organic solvent solutions can also contain water and acids or alkalis of the non-precipitating type. Hydrochloric acid solutions are preferred. These can be either acidic or alkaline because when hydrochloric acid is used to short stop the second stage epoxidation it is not necessary to reduce the pH below about 9. The alkalinity here is furnished by the polyamine.

The solids content of the resin solutions can vary widely up to about 65% without being too viscous to pour but it is usually preferable to use the resin solutions at a solids content of 10% to 20%.

In general, these resins will contain 16 to 70 epoxy groups per 100 molecules of resin. The epoxide equivalent of the final resin will vary depending on the polyepoxide used but is usually 200 to 2000, and preferably 1100 to 2000.

The preferred resins have a structure derived from the polyepoxide consisting of alternating aliphatic chains and aromatic nuclei. They preferably contain at least 9% by weight nitrogen.

To illustrate the manner in which the epoxide equivalent can vary depending upon the molecular weight of the reactants, the resin produced by reacting two moles of tetraethylene pentamine with one mole of Epon 828 and a second addition of 0.5 mole of Epon 828 has a calculated epoxide equivalent of 950. If diethylene triamine and butadiene dioxide are used, the epoxide equivalent is 340.

The addition of the formaldehyde has a number of important advantages such as (a) increasing the molecular weight; (b) giving a further condensation of the molecule on beating after it is adsorbed on the fiber; (c) giving a reactive point for subsequently added condensation resins; and (d) providing hydrophilic areas to prevent "dry cleaning" of the fiber by solvent dissolved resins.

The anionic water insoluble substances such as cellulose and starch are characterized by containing reactive hydroxyl groups. These react with the epoxy groups of the epoxidized amine to bond the latter to the cellulose or starch, thereby introducing into the latter a cationic (amino) group and a lipophilic group which changes the surface of the cellulose or starch to oil wetting. Example LXII shows that propylenediamine does not have a sufficient number of carbon atoms in the proper configuration to be lipophilic or oil wetting. Hence the reaction of propylene diamine with Epon 828 followed by the addition of more Epon 828 did not produce an altering resin but if the amine molecule contains at least four carbon atoms (e.g., phenylene diamine, diethylenetriamine, dipropylene triamine, triethylene tetramine, tetraethylene pentamine, etc.) an altering effect is obtained.

The altering of anionic fibers and the treatment of the altered fibers with non-aqueous anionic and/or non-ionic resins is claimed in my copending application Ser. No. 129,517, filed Aug. 7, 1961, later refiled as Ser. No. 424,114, filed Jan. 7, 1965. The last mentioned application matured into U.S. Patent 3,328,234 on June 27, 1967.

The invention is hereby claimed as follows:

1. A process for adhering a substance from the class consisting of anionic and non-ionic resins and pigments to an anionic material from the class consisting of cellulose and starch which consists essentially of reacting said anionic material with an aqueous dispersion of a hydrophilic altering resin from the group consisting of (a) hydrophilic epoxidized precondensates of a polyepoxide having an epoxide equivalent of at least 43 and a polyamine containing at least four carbon atoms and (b) formaldehyde polymers of (a), said altering resin containing at least two equivalents of reactive amino groups for each epoxide group in the precondensate and 0.1 to 0.8 equivalent of additional epoxide group in the altering resin (a) and at least one mole of formaldehyde per mole of epoxidized precondensate in altering resin (b), said altering resin being effective to convert said anionic material to a cationic nitrogenated material, and bringing said cationic nitrogenated material into contact with a substance to be adhered thereto from the class consisting of anionic and non-ionic resins and pigments.

2. A process as claimed in claim 1 in which said epoxidized precondensate contains at least 9% by weight nitrogen.

3. A process as claimed in claim 1 in which said epoxidized precondensate contains an olefinic unsaturated group bonded thereto.

4. A process as claimed in claim 1 in which said epoxidized precondensate contains a hydrocarbon group of 12 to 18 carbon atoms bonded to an amino group thereof.

5. A process as claimed in claim 1 in which said anionic material and said altering resin in aqueous dispersion are heated to at least 120° F.

6. A process as claimed in claim 1 in which said substance to be adhered is added to an aqueous suspension of said cationic nitrogenated material.

7. A process as claimed in claim 1 in which said anionic material which is reacted with said altering resin is cellulose.

8. A process as claimed in claim 1 in which said anionic material which is reacted with said altering resin is a starch.

9. A process as claimed in claim 1 in which said altering resin is a polyethylene polyamine containing two primary amino groups reacted with a polyepoxide having approximately two epoxy groups and an epoxide equivalent of 43 to 1000, in proportions of approximately 2 moles of said polyamine per mole of said polyepoxide and further epoxidized to give a hydrophilic epoxidized precondensate containing free epoxy groups and containing at least 9% nitrogen.

10. A process as claimed in claim 9 in which said epoxidized precondensate is condensed with formaldehyde in sufficient amount to increase the viscosity of aqueous solutions of said altering resin short of gel formation.

11. A process as claimed in claim 9 in which said anionic material is cellulose and said substance to be adhered thereto is a polyester resin.

12. A process as claimed in claim 9 in which said anionic material is cellulose and said substance to be adhered thereto is a hydrocarbon resin from the class consisting of polystyrene, styrene-butadiene copolymers and petroleum resins.

References Cited

UNITED STATES PATENTS

| | | | |
|---|---|---|---|
| 2,601,597 | 6/1952 | Daniel et al. | 162—168 |
| 2,909,448 | 10/1959 | Schroeder | 260—9 |
| 2,951,004 | 8/1960 | Martin et al. | 161—184 |
| 3,026,285 | 3/1962 | Hirosawa et al. | 260—834 |
| 3,036,948 | 5/1962 | Danielson | 161—184 |
| 3,129,133 | 4/1964 | Doyle et al. | 260—2 |

WILLIAM H. SHORT, *Primary Examiner.*

E. M. WOODBERRY, *Assistant Examiner.*